United States Patent [19]

Pardee

[11] 4,071,460
[45] Jan. 31, 1978

[54] LUBRICANTS COMPRISING DIALKANOLAMINE DERIVATIVES

[75] Inventor: Robert P. Pardee, Boulder, Colo.

[73] Assignee: Ball Brothers Research Corporation, Boulder, Colo.

[21] Appl. No.: 722,175

[22] Filed: Sept. 10, 1976

[51] Int. Cl.$^2$ .............................................. C10M 1/32
[52] U.S. Cl. .................................. 252/51.5 R; 252/51
[58] Field of Search ...................... 252/51, 51.5 R, 58

[56] References Cited

U.S. PATENT DOCUMENTS

| | | | |
|---|---|---|---|
| 2,325,533 | 7/1943 | Montgomery et al. | 252/51.5 R |
| 3,711,406 | 1/1973 | Lowe | 252/51.5 R X |
| 3,755,433 | 8/1973 | Miller et al. | 252/51.5 R |
| 3,862,860 | 1/1975 | Pardee et al. | 252/58 X |

Primary Examiner—Delbert E. Gantz
Assistant Examiner—Andrew H. Metz
Attorney, Agent, or Firm—Gilbert E. Alberding

[57] ABSTRACT

An article of manufacture and a method are disclosed herein for improving lubricity and wear resistance of a given substrate by applying thereto a solution consisting essentially of a dialkanolamine and a halogenated hydrocarbon carrier. The composition herein disclosed has been found to be most effective as preservatives for coating sundry substrates, especially gramophone or phonograph record surfaces whereby there is effected a marked reduction of record groove wear while substantially minimizing noise and harmonic distortion. The preferred composition herein contemplated and disclosed is one consisting essentially of a N-alkyl-substituted N,N-dialkanolamine and a halogenated hydrocarbon carrier, said dialkanolamine having the formula:

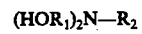

$(HOR_1)_2N—R_2$ wherein $R_1$ is alkylene selected from the group consisting of ethylene, isopropylene and propylene and $R_2$ is alkyl having four to 20 carbon atoms.

14 Claims, No Drawings

LUBRICANTS COMPRISING DIALKANOLAMINE DERIVATIVES

BACKGROUND OF THE INVENTION

1. Field of the Invention

The present invention pertains generally to lubrication of substrates and, more particularly, to an improved lubrication compositon, methods of application and articles resulting from the implementation of such methods. The improved, wear-resistant, low friction substrates result from simply treating said substrates with the composition of the present invention. Although a wide variety of substrates can be treated with the composition of the invention, special substrates having recordings thereon or capable of having recordings thereon are particularly contemplated. Such substrates include computer recording discs, magnetic recordings, photographic projection film such as moving picture film, slide film, and microfilm as well as sound and video recordings such as gramophone or phonographic records, video discs and the like.

2. Description of the Prior Art

Sound recording media have been extensivey used for some years in at least three major fields, namely, in the manufacture of phonograph records, in recording media in dictating machines wherein they may be in the form of endless belts, sheets, discs and in other forms, and in the computer system field to record data in various plastic coated surfaces in the form of drums, discs and the like.

Lubrication of the various media, and, particularly substrates upon which recorded signals have been stored and from which said signals can be recalled by dynamic means, has not been generally recognized as a straightforward act. Where attempts have been made to lubricate such substrates, they have not proven fully satisfactory. In particular, substrates possessing this special problem include synthetic, natural and combinations of thermoplastic materials and include resins, shellac, polyvinyl acetate, polyvinyl chloride, cellulose acetate, cellulose nitrate, polyvinyl benzene, and their derivatives. Numerous other compositions are contemplated and especially those which are generally formed through various press moulding means into phonographic records or discs as well as similar thermoplastic structures having trackable, helical groove contours thereon, which when used in conjunction with certain dynamic means such as styli are capable of following said contours thereby reproducing recorded monaural and stereophonic and video signals.

As is generally known, a phonograph cartridge serves to convert the variations on the walls of the grooves of a phonograph record into electrical signals whereby the variations or wavy pattern on the grooves determine the frequency and the amplitude of the sound vibrations. The cartridge includes a stylus or pickup needle, usually in the form of a diamond or sapphire, which generally has a hemispherical or ellipsoidal tip which rides or dips into the record groove and moves in response to variations of the pattern of said groove. The stylus, in turn, is generally attached to an armature which moves with the stylus to induce variations in an electrical or magnetic field in response to the stylus movement. This generates an electrical signal representative of the groove configuration which may then be amplified and used to drive speakers. Again, the stylus is caused to mechanically vibrate in response to the variations in amplitude and frequency of the undulations of the record groove wall which comprises the recorded signal.

A stylus has to track a plurality of evenly spaced groove contours with recorded signals on the order of between 15-20 and 20,000 Hz. Moreover, with the introduction of discrete four-channel record systems or quadrasonic systems, a stylus must faithfully track grooves with recorded signals to cause vibrations of up to 50,000 Hz. As the stylus rides in the record groove, the relatively hard stylus wears away the relatively soft thermoplastic material of the record forming the groove. There has been heretofore no easy solution to alleviate the problem of record wear caused by the stylus riding in the groove contour of such recordings.

The deterioration of the sound quality of records with increase in the number of plays through wear of their tracks by repeated uses results in records becoming unusable and often being discarded within a short period of time. A number of factors are responsible for wear including the general wear through abrasive and adhesive wear mechanisms to an extent proportional to stylus loading. This loading is not only the deadweight stylus load on the record which may range from about 1 gram to 4 grams but also includes dynamic inertial forces caused by stylus mass and the frequency of stylus directional changes as it tracks the groove undulations. As known, reduction of deadweight load and stylus mass lowers the rate of groove wear, but wear and the consequent loss of playback fidelity cannot be entirely eliminated. At any rate, most attempts of the prior art via record cleaners or alleged lubricants have simply resulted in cleaning only or depositing chemical films onto records without being successful, in that such materials generally reduce the record fidelity due to rapid groove wear, if cleaned, or to hydrodynamic damping of the stylus tracking, if oily substances are deposited. Further, it is often observed in the use of these materials that the noise level is increased due mainly to dust captured along with the formation of a tacky deposit upon the stylus. Moreover, it has been observed that attempts to use powdered solid lubricants such as graphite, molybdenum disulfide and the like have several disadvantages for they do not only reduce the fidelity, but they also increase noise due to particulate interference in the record grooves.

U.S. Pat. No. 3,048,265 describes prevention of moisture fogging of thermoplastic film surfaces, especially polyolefin films by treatment with polyoxyethlene amines.

U.S. Pat. No. 3,398,197 discloses N-secondary-alkyl tertiary amine compounds useful in various chemical technologies including fuel additives and bactericides.

U.S. Pat. No. 3,899,433 describes a lubricating composition containing trichlorotrifluoroethane and several alcohol components having from about 18 to about 40 carbon atoms.

U.S. Pat. No. 3,345,424 describes the use of various telomer compositions of polymeric fluorocarbons which generally find utility for coating various surfaces to impart mold release, water and oil repellent properties and the like.

U.S. Pat. No. 3,502,588 describes certain compositions containing tetrakis(dimethylamino)ethylene in a fluorinated hydrocarbon to produce chemiluminescence when sprayed in the air or when deposited on a given surface.

U.S. Pat. No. 3,631,162 discloses an antistatic additive comprising N-(2-hydroxy-3-dodecyloxypropyl)ethanolamine and N,N-bis(2-hydroxyethyl)alkylamine.

U.S. Pat. No. 3,652,314 discloses a method for renewing, resurfacing and preserving a phonograph record by the steps of coating the record with a composition consisting essentially of acrylic polymer, polyethylene emulsion, a detergent, an ether and water, brushing the composition into the grooves, removing any excess, drying and playing the phonograph record.

U.S. Pat. Nos. 3,862,860 and 3,954,637 disclose a method and composition for improving lubricity, abrasion resistance, and lowering the coefficient friction of substrates such as photographic films, magnetic surfaces and other recording elements by applying to such substrates a solution comprising tetrafluoroethylene telomer and a copolymer of vinyl chloride and trifluorochloroethylene in a volatile solvent, drying and removing the excess, and substrates so lubricated. In effect it was shown that the combination of a lubricant, viz., tetrafluoroethylene telomer and non-lubricant, viz., poly(trifluorochloroethylene-co-vinyl chloride) provides a coefficient of friction below that of the lubricant per se.

SUMMARY OF THE INVENTION

This invention is founded on the remarkable discovery that certain dialkanolamines are extremely effective lubricants upon sundry substrates but especially upon those substrates having dynamic presentations thereon, such as phonograph records, discs, recording tapes and the like.

The term "substrate" as used herein embraces various surfaces of articles to be treated by the compositions and refer to plastic substrates, metal substrates, combination of plastic and metallic substrates, and in particular to playing elements of synthetic, natural and combinations of thermoplastic materials and include resins, shellac, polyvinyl esters such as polyvinyl acetate, polyvinyl benzene, polyvinyl chloride, cellulose acetate, cellulose butyrate, cellulose nitrate, their derivatives as well as copolymers and blends thereof. In particular, the term "substrates" include those surfaces which are made of numerous compositions that are generally formed through various press molding means into phonographic records or discs as well as similar thermoplastic structures having trackable groove contours thereon which when used in conjunction with certain dynamic means such as styli are capable of following said contours and reproducing recorded monaural and stereophonic and video signals therefrom.

In particular, the present invention, which provides a wear-resistant lubricous coating for sundry substrates, consists essentially of a solution of a dialkanolamine and a carrier for said dialkanolamine. The composition can be easily applied to any number of the aforementioned substrates and especially to thermoplastic substrates generally used in the record or gramophone trade upon which are recorded signals in the form of undulations or grooves, the composition herein providing a coating or film that promotes a marked increase in lubrication and wear properties thereof.

Accordingly, an object of the present invention is to provide a method which produces a substrate having low, effective friction characteristics.

Still another object of the present invention is to provide a coated record surface having long life, great wear resistance and low surface friction.

Another object of the present invention is to provide a composition and method which impart abrasion resistance to substrates, especially thermoplastic surfaces, through a protective coating that will withstand certain loads.

An object of this invention is to provide a method and phonograph record article or similar plastic substrate having a greater extension of its playing life.

Another object of the present invention is to provide a composition and metod which impart wear resistance to phonograph elements through a protective coating capable of bearing a momentary load without any significant reduction in playing functionalities after a substantial number of plays.

Another object of this invention is to produce a treated phonograph record, tape or disc which after a large number of plays does not result in any substantial wear or particle build-up thereon.

Yet still another object of the present invention is to provide a recording surface having both high lubricity, low noise and reduction in harmonic distortion.

A further object of the present invention is to provide an improved, thin lubrication system for groove-tracking record elements having recorded audio and/or video signals stored thereon and which can be subjected to dynamic tracking means to render the signals recorded thereon.

These and other objects of the present invention will become apparent from the following description and discussion. Unless otherwise stated, all parts and percentages are by weight.

DETAILED DESCRIPTION OF THE INVENTION

The composition of the present invention which imparts to a given substrate a low coefficient of friction consists essentially of a solution of a dialkanaolamine in a carrier or solvent therefor. The dialkanolamine has the formula:

$$(HOR_1)_2N—R_2$$

wherein $R_1$ is an alkylene having 2 to 3 carbon atoms, i.e., ethylene, isopropylene and propylene and $R_2$ is a hydrocarbon radical having four to 20 carbon atoms. The hydrocarbon radical, $R_2$, may be either an alkyl, aryl, and alkaryl, i.e., an alkyl-substituted aryl radical, such as tolyl. Illustrative examples of such dialkanolamines are the following:

N-butyl N,N-beta,beta'-diethanolamine
N-butyl N,N-beta,beta'-diisopropanolamine
N-octyl N,N-beta,beta'-diethanolamine
N-octyl N,N-beta,beta'-diisopropanolamine
N-octyl N,N-gamma,gamma'-diisopropanolamine
N-decyl N,N-beta,beta'-diethanolamine
N-decyl N,N-beta,beta'-diisopropanolamine
N-decyl N,N-gamma,gamma'-diisopropanolamine
N-lauryl N,N-beta,beta'-diethanolamine
N-lauryl N,N-beta,beta'-diisopropanolamine
N-lauryl N,N-gamma,gamma'-dipropanolamine
N-myristyl N,N-beta,beta'-diethanolamine
N-myristyl N,N-beta,beta'-diisopropanolamine
N-myristyl N,N-gamma,gamma'-dipropanolamine
N-butylauryl N,N-beta,beta'-diethanolamine
N-butylauryl N,N-beta,beta'-diisopropanolamine
N-butylauryl N,N-gamma,gamma'-dipropanolamine
N-stearyl N,N-beta,beta'-diethanolamine N-stearyl N,N-beta,beta'-diisopropanolamine
N-stearyl N,N-gamma,gamma'-dipropanolamine
N-phenyl N,N-beta,beta'-diethanolamine
N-meta-tolyl N,N-beta,beta'-diethanolamine.

The dialkanolamines can be readily made by conventional chemical techniques known in the art. A process for preparing various N-alkyl substituted N,N-beta,-beta'-dialkanolamines is disclosed in U.S. Pat. No. 2,541,088 wherein N,N-beta,beta'-diethanolamines or N,N-beta,beta'-diisopropanolamines are reacted with certain higher molecular alkyl halides in the presence of specified added organics having the property of acting as a mutual solvent for the reactants but providing relatively high yields of the N-alkyl substituted N,N-dialkanolamines.

The dialkanolamines herein contemplated and disclosed may be employed in amounts ranging from about 1.0 to about 0.001 weight percent based on the total weight of the mixture, preferably from about 0.05 to about 0.01 weight and especially from about 0.03 to about 0.01 weight percent. The resulting treated article which also forms a part of this invention is made by applying such to the surface and removing the carrier whereby there is deposited thereon said dialkanolamines ranging from about 0.3 to 3 micrograms per square centimeter.

A preferred composition of the subject invention is one consisting of a solution of a dialkanolamine and a carrier therefor. The preferred dialkanolamines are the following:

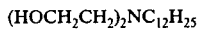
$(HOCH_2CH_2)_2NC_{12}H_{25}$

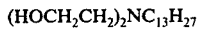
$(HOCH_2CH_2)_2NC_{13}H_{27}$

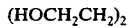
$(HOCH_2CH_2)_2$

$NC_{14}H_{29}$

In general these dialkanolamines have a density of about 0.89 g/ml at ca. 75° F.

The preferred carrier of said composition is trichlorotrifluorethane; however, any of a number of other volatile solvents are useful carriers for dialkanolamines, provided only that they have no adverse effect on the substrates and have adequate dissolution powers for dialkanolamines. The trichlorotrifluoroethane, which can be either 1,1,1-trichloro-2,2,2-trifluoroethane or 1,1,2-trichloro-1,2,2-trifluoroethane, is a particularly desirable carrier for application of dialkanolamines to plastic substrates because of its compatability with most plastic materials, including those used to manufacture phonograph records, video discs, and other recording media.

The other aforementioned useful carriers may be incorporated in the composition of the present invention either individually or in miscible combinations with themselves or with trichlorotrifluoroethane, provided there is no adverse effect upon the substrate. Such other carriers include the following:

| Alcohols | Ketones | Esters |
| --- | --- | --- |
| methanol | acetone | ethyl acetate |
| ethanol | methylethyl ketone | propyl acetate |
| n-propanol | methylpropyl ketone | isopropyl acetate |
| isopropanol | methylisopropyl ketone | butyl acetate |
|  | methylisobutyl ketone |  |
|  | diethyl ketone |  |
|  | ethylpropyl ketone |  |
|  | ethylisopropyl ketone |  |

-continued

| Halogenated Hydrocarbons | Hydrocarbons |
| --- | --- |
| carbon tetrachloride | benzene |
| chloroform | tolulene |
| methylene chloride | xylene |
| methyl chloroform | pentane |
| tetrachloroethylene | hexane |
| trichloroethylene | heptane |
| dichloroethane | octane |
| dichloroethylene |  |
| perfluorodimethylcyclobutane |  |
| benzotrifluoride |  |

Treatment of the various substrates herein contemplated can be accomplished by applying the above-described composition in a concentration generally less than 1 weight percent of the dialkanolamine relative to the volatile carrier on the substrate, evaporating the carrier therefrom to provide a coating or film thereon which consists essentially of the non-volatile portion of the compositon, i.e., the said dialkanolamine. Application of the composition can be accomplished by numerous means including spraying, dipping, brushing, swabbing, flowing and doctoring. For most purposes, spraying and swabbing are preferred because of the complete and uniform coverage these methods afford.

There will be illustrated herein preferred examples of the lubricating compositions of this invention and method of using the same. The specific illustrations, however, are not intended to be a limitation upon the breath of applicant's invention. Generically, the invention taught herein is one in which a volatile carrier transports therein an essentially non-volatile material, the latter forming a film upon a given substrate after the carrier has volatilized.

EXAMPLE I

A solution was prepared consisting of 99.97 percent by weight of trichlorotrifluoroethane (Freon TF) and 0.03 percent by weight of Anti-Stat 273C, a commercial N,N-bis(2-hydroxyethyl)alkylamine (available from Fine Organics, Incorporated, Lodi, N.J.), the alkyl moiety thereof ranging from dodecyl to tetradecyl. A clear solution resulted and was sprayed onto a phonograph test record, National Association of Broadcasters (NAB) test record No. 12-5-98, the trichlorotrifluoroethane was allowed to evaporate, and the playing surface was lightly buffed to leave a thin coating of said alkylamine thereon. The record was then subjected to playing and compared with an untreated record to determine changes in any surface noise. For this purpose, the signal from the stylus, tracking at one gram load in the record grooves, was fed to a Tektronix 5100 Series Storage Oscilloscope for display. During the first number of playings, the coated record showed significantly less surface noise than did an uncoated record; and progressively throughout some 120 playings, the level of background or surface noise of the coated record ultimately reached the noise level that the uncoated record showed on its first playing.

EXAMPLE II

Accelerated phonograph record wear tests were conducted on NAB test records which had been reated with the compositions of the subject invention. The results achieved from treated records were compared with the results of the wear test conducted on a cleaned test record which had not been treated in accordance with the present invention. The test utilized a standard type automatic record turntable rotating at 33⅓ rpm with the stylus on the tone arm adjusted to 9.5 grams load on the record surface. This high stylus load was used in order to accelerate the wear process and thereby provide better discrimination among record treatments. Various compositions of the present invention were applied to the record surfaces in accordance with the procedure described in Example I. Test results are presented in the tabulation below:

| Phonograph Test Record Identification | Number of Times Played | Composition of Record Treating Solution: Trichlorotrifluoroethane plus the following (wt. %) | Record Surface Appearance at Test Termination and Relative Rating |
|---|---|---|---|
| | | | (0 = clean, 100 = heavily covered with wear debris) |
| A | 129 | 0.03% by wt. N,N-bis(2-hydroxyethyl)alkylamine, (alkyl = $C_{12}$–$C_{14}$), Anti-Stat 273C. | Clean surface no visible weak particles. Rating = 0 |
| B | 108 | 0.018% by wt. N,N-bis(2-hydroxyethyl)alkylamine, (alkyl = $C_{12}$–$C_{14}$), Anti-Stat 273C. | Practically clean--1 or 2 visible wear particles. Rating = 1 |
| C | 130 | 0.03% by wt. N,N-bis(2-hydroxyethyl)alkylamine, (alkyl = $C_{18}$), Anti-Stat 273E. | Practically clean--a few wear particles. Rating = 2 |
| D | 128 | None; control record. Record surface was wiped with velvet swatch saturated with the trichlorotrifluoroethane only. | Surface evenly flecked with visible but tiny white wear debris. Rating = 75 |

The above examples show that compositions of the subject invention effectively prevent phonograph record groove wear and preserve original recorded fidelity; and the compositions markedly reduce background or surface noise when applied to a record and significantly retard the rate of noise increase over a large number of actual playings.

There has been disclosed herein a method of and a composition for lubricating surfaces, and in particular those surfaces which are capable of having or have dynamic presentations thereon. In view of this specification, those skilled in the art will have many modifications which fall within the true spirit and scope of this invention. It is intended that all such modifications be within the scope of the appended claims.

I claim:

1. A composition for imparting wear resistance to a surface having dynamic presentations thereon consisting essentially of a solution of an essentially nonvolatile N-alkyl-substituted N,N-dialkanolamine in an amount ranging from about 1.0 to about 0.001 weight percent and a volatile carrier selected from the group consisting of alcohols, ketones, esters, halogenated hydrocarbons and hydrocarbons.

2. The composition of claim 1 wherein said dialkanolamine has the general structural formula:

$$(HOR_1)_2N-R_2$$

wherein $R_1$ is alkylene having two to three carbon atoms and $R_2$ is a hydrocarbon radical having four to 20 carbon atoms.

3. The composition of claim 2 wherein said alkylene is selected from the group consisting of ethylene, isopropylene and propylene.

4. A composition for imparting wear resistance to a surface having dynamic presentations thereon consisting of a solution of an essentially non-volatile N-alkyl-substituted N,N-dialkanolamine in an amount ranging from about 1.0 to about 0.001 weight percent and a volatile carrier selected from the group consisting of alcohol, ketones, esters, halogenated hydrocarbons and hydrocarbons.

5. The composition of claim 4 wherein said dialkanolamine has the general structural formula:

$$(HOR_1)_2N-R_2$$

wherein $R_1$ is alkylene having two or three carbon atoms and $R_2$ is a hydrocarbon radical having four to 20 carbon atoms.

6. A composition for imparting wear resistance to a surface having dynamic presentations thereon consisting essentially of a solution of N-alkyl-substituted N,N-dialkanolamine in an amount ranging from about 1.0 to about 0.001 weight percent in a halogenated hydrocarbon.

7. The composition of matter as recited in claim 6 wherein said N-alkyl-substituted N,N-dialkanolamine has the formula:

$$(HOR_1)_2N-R_2$$

wherein $R_1$ is alkylene selected from the group consisting of ethylene, isopropylene and propylene and $R_2$ is a hydrocarbon radical having about four to 20 carbon atoms.

8. The composition of claim 6 wherein the halogenated hydrocarbon has one to six carbon atoms.

9. A composition for imparting wear resistance to a surface having dynamic presentations thereon consisting of a solution of a N-alkyl-substituted N,N-dialkanolamine in an amount ranging from about 1.0 to about 0.001 weight percent in a halogenated hydrocarbon.

10. The composition of matter as recited in claim 9 wherein said N-alkyl-substituted N,N-dialkanolamine has the formula:

$$(HOR_1)_2N-R_2$$

wherein $R_1$ is alkylene selected from the group consisting of ethylene, isopropylene and propylene and $R_2$ is a hydrocarbon radical having about four to 20 carbon atoms.

11. The composition of claim 9 wherein the halogenated hydrocarbon has one to six carbon atoms.

12. A composition for imparting wear resistance to a surface having dynamic presentations thereon consisting of a solution of from about 1.0 to about 0.001 weight percent N-alkly-substituted N,N-dialkanolamine in a volatile, halogenated aliphatic hydrocarbon having from one to six carbon atoms.

13. The composition of claim 12 wherein said dialkanolamine has the formula:

$$(HOR_1)_2N-R_2$$

wherein $R_1$ is alkylene selected from the group consisting of ethylene, isopropylene and propylene and $R_2$ is a hydrocarbon having about four to 20 carbon atoms.

14. The composition of matter as recited in claim 12 wherein said halogenated aliphatic hydrocarbon is selected from the group consisting of trichlorotrifluoroethane, perfluorodimethylcyclobutane, carbon tetrachloride, chloroform, methylene chloride, methyl chloroform, tetrachloroethylene, trichloroethylene, dichloroethane, and dichloroethylene.

* * * * *